United States Patent [19]
Malleolo

[11] Patent Number: 5,598,379
[45] Date of Patent: Jan. 28, 1997

[54] SATELLITE ULTRASONIC PEST REPELLER

[76] Inventor: Patrick F. Malleolo, 1541 Parkway Loop, Suite G, Tustin, Calif. 92680

[21] Appl. No.: 606,287

[22] Filed: Feb. 23, 1996

[51] Int. Cl.$^6$ .................................................. H04R 1/02
[52] U.S. Cl. ........................................ 367/139; 340/384.2
[58] Field of Search ........................ 367/139; 340/384.2; 116/22 A; 43/124

[56] References Cited

U.S. PATENT DOCUMENTS

| | | | |
|---|---|---|---|
| 3,636,559 | 1/1972 | Del Grande et al. | 340/384 |
| 4,414,653 | 11/1983 | Pettinger | 367/139 |
| 4,562,561 | 12/1985 | Ackley | 367/139 |
| 4,616,351 | 10/1986 | Hall | 367/139 |
| 4,999,818 | 3/1991 | Malleolo | 367/139 |

Primary Examiner—Ian J. Lobo
Attorney, Agent, or Firm—Anthony J. Coco

[57] ABSTRACT

An integrated system which provides an extension of the effective operational area of a single unit ultrasonic pest repeller is disclosed. A master unit produces selectable acoustic waveforms from a speaker and also produces selectable electronic output signals for delivery to a first satellite unit. The first satellite unit produces a similar acoustic repelling waveform and also replicates the master unit electronic output signal for delivery to an identical second satellite unit. Each subsequent satellite unit in a serial chain of satellite units is powered by its own wall plug-in transformer so that the chain may be as long as necessary to accomplish deterrence of roaches, insects including bees, and rodents from the entire area to be protected.

10 Claims, 2 Drawing Sheets

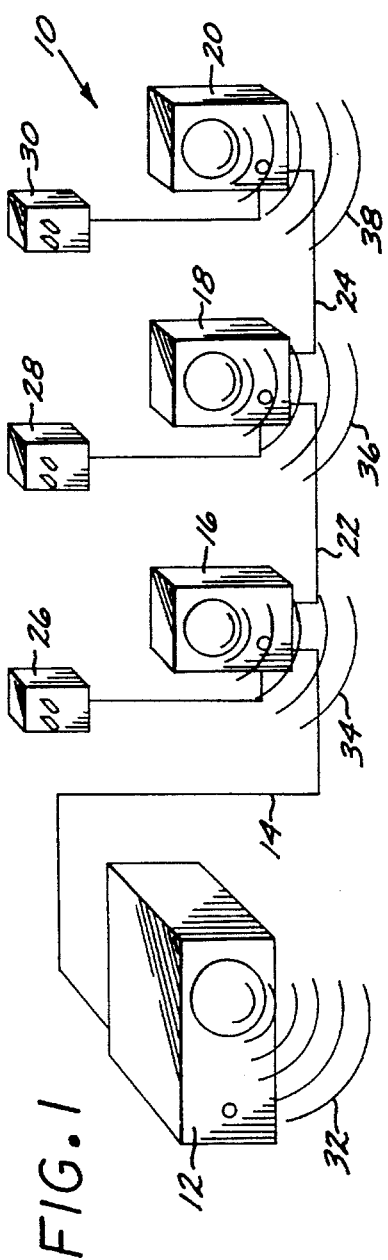
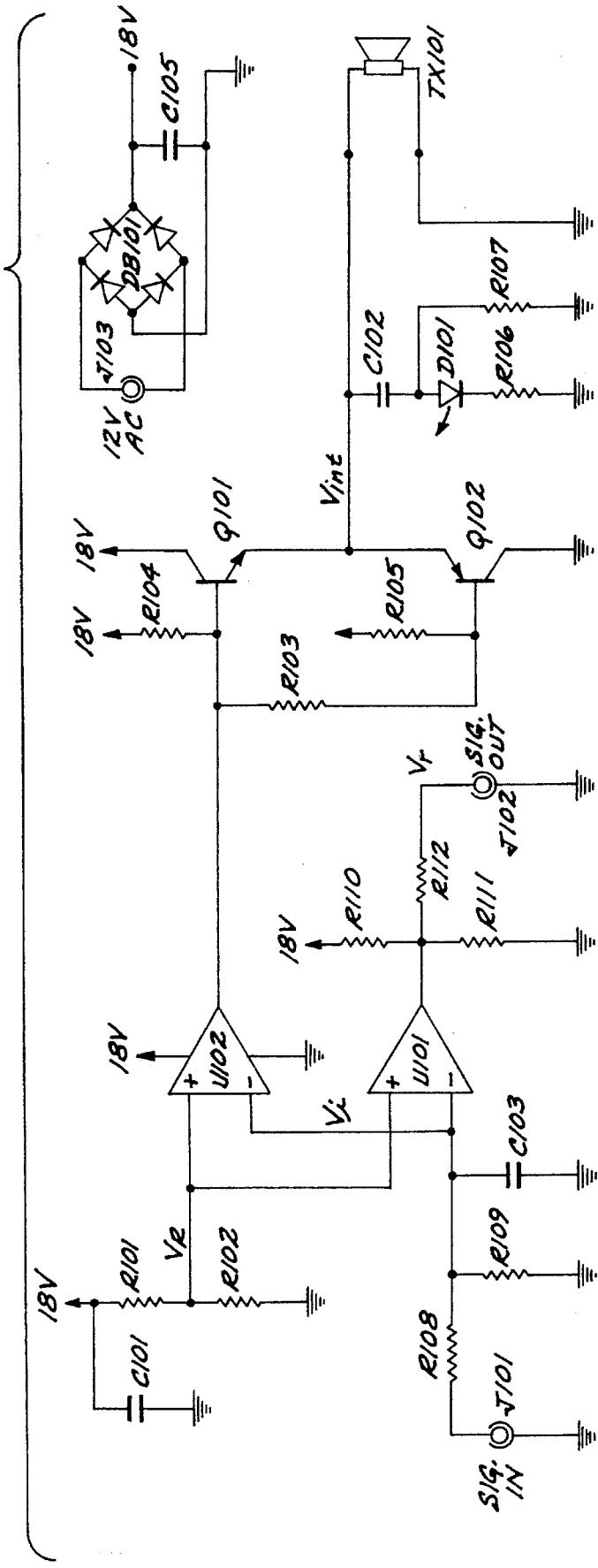
FIG. 1
FIG. 3

SATELLITE ULTRASONIC PEST REPELLER

BACKGROUND

1. Field of the Invention

This invention is directed to pest control devices employing ultrasonic signal generation. More particularly, the invention is directed to apparatus for extending the effective range and utility of an ultrasonic device for repelling rodents, insects including bees, roaches and the like.

2. Prior Art

Traditionally, elimination of pests and vermin has involved either physically trapping, chemically disabling or otherwise killing the annoying or dangerous intruders. Capturing of pests or vermin is cumbersome at best, while chemical components used in extermination and thus toxic to the pests, are frequently harmful to humans and domestic animals as well. Even electrical or cryonic means, while less dangerous to the environment, result in the disadvantageous presence of the expired creatures remaining on the premises to be cleared.

Modernly, systems are employed which are designed to drive the pests and vermin away from the premises, and to prevent entry of new pests as well as reentry of the former pests. Prevention of initial infestation is advantageous over traditional pest control methods, and such systems produce no carcasses to be removed.

These modern systems are represented by the class of electronic methods and apparatus including the ultrasonic pest repeller disclosed in my U.S. Pat. No. 4,999,818, which employs non-complex generation of sound signals or waveforms that are sufficiently high in frequency to be undetected by humans and pets, but which are at the same time unacceptably irritating to pests and vermin. For purposes of this specification, the word "acoustic" will mean pertaining to sound that may be heard by any living creature, including such high frequency irritating sound.

U.S. Pat. No. 4,562,561—Ackley discloses an ultrasonic repeller generating respectively a steady, modulated signal; a pulsed signal; and a swept signal in a relatively complex operational embodiment. U.S. Pat. No. 3,939,559—Del Grande et al. discloses simultaneous frequency and random amplitude modulation of a range of frequencies. U.S. Pat. No. 4,616,351—Hall discloses a sound generator in a housing having a prong or threaded electrical connector for plugging into a receptacle outlet.

None of the prior art devices fulfills the long felt need for increasing the useful range of acoustic signal output to cover the wider areas often involved in ridding larger premises of pests and vermin. It is an object of this invention to provide an integrated system to extend the effective deterrent range of a single ultrasonic pest repeller or master unit.

It is another object of the invention to provide a lightweight, powerful satellite signal processor and power driver that meets or exceeds the master unit's specifications for repelling rodents, insects including bees, roaches and the like.

It is yet another object to provide a capability for serially connecting a number of such satellites to further increase the operational area of clearance.

SUMMARY OF THE INVENTION

The present invention is directed to a pest repelling system that employs a master unit which produces both a selectable electronic output signal and a corresponding pest deterrent acoustic ultrasonic output signal or waveform, in combination with one or more satellite units for extending the physical operational range of the master unit.

Each satellite unit features a signal processor which produces an electronic output signal that replicates in shape and amplitude the electronic output signal produced by the master unit. Each satellite unit also features power driver and transducer elements which produce an acoustic output signal substantially identical to the acoustic output of the master unit. Each satellite unit receives as input the electronic output signal from the master unit or from an immediately preceding satellite unit in a serial chain.

Since each satellite unit has its own wall plug-in transformer external to the unit itself for supplying AC power and replicates the electronic output signal for relaying to the next satellite unit in the serial chain, such a chain may be as long as required to effect complete coverage of the area to be protected from pests.

These features and advantages of the present invention will become apparent with reference to the following detailed description of an exemplary embodiment, when taken in conjunction with the accompanying drawings, wherein like reference designations have been applied to like elements.

BRIEF DESCRIPTION OF THE DRAWING FIGURES

FIG. 1 is a pictorial block diagram illustrating a chain connection of master and satellite units embodying the principles of the present invention.

FIG. 3 is a schematic diagram illustrating the circuitry of a satellite unit of FIG. 1.

DETAILED DESCRIPTION OF AN EXEMPLARY EMBODIMENT

Figure 2:
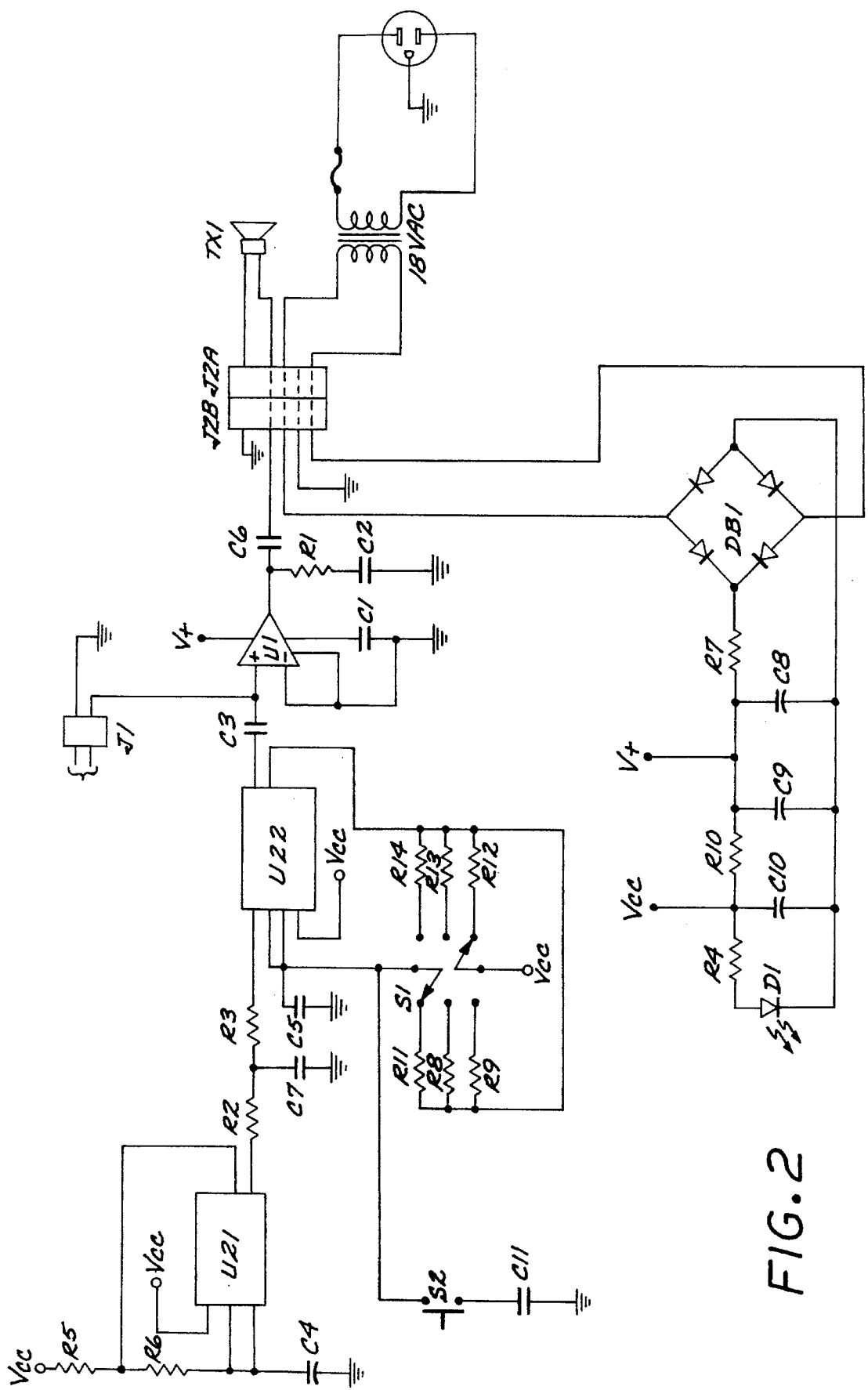
FIG. 2 is a schematic diagram illustrating the circuitry of a master unit of FIG. 1.

A block diagram of an apparatus 10 embodying the principles of the present invention is presented in FIG. 1, wherein an ultrasonic pest repeller master unit 12 is shown connected via a two-conductor cable such as twisted pair cable 14 carrying an electronic output signal to a first satellite unit 16. Identical satellite units 18 and 20 are similarly connected in a serial chain from the first satellite unit 16 by the cables 22 and 24, respectively. Although only three such satellite units are shown for purposes of illustration, it will become apparent that the design of the satellite units advantageously provides signal processing that permits the connection of many more such units in a longer chain without degradation of the conveyed electronic signal.

Supply voltage for the master unit 12 may be provided by a conventional AC source or by a DC primary or secondary storage battery source such as a twelve volt DC automotive type battery (not shown). The satellite units 16, 18, 20 may be powered by individual wall-plug transformers 26, 28, 30 respectively as described in more detail below.

In addition to the previously mentioned electronic output produced by each unit 12, 16, 18 and 20, each unit also produces an acoustic repelling signal represented by the respective waveforms 32, 34, 36 and 38 emanating from the master and satellite units.

Master Unit

Circuitry for the master unit of this embodiment is illustrated in FIG. 2, wherein an ultrasonic pest repeller having the known features of my U.S. Pat. No. 4,999,818 is improved by the presence of an audible testing pushbutton switch S2 and an electronic signal takeoff jack J1.

Voltage V+ is supplied to a power driver audio amplifier U1 through a power and speaker jack J2A/J2B from a conventional 18 volt AC transformer that feeds diode bridge DB1 and the RC combination of resistor R7 and capacitor C8. The power supply voltage is then stepped down through a resistor R10 together with the capacitors C9 and C10 to provide the voltage Vcc to the integrated circuits (IC) U21 and U22. A Light Emitting Diode D1 and a series resistor R4 are connected in shunt with the diode bridge DB1 to provide a visual indication of the presence of power to the master unit 12.

A voltage divider network R5, R6 and C4 operates to provide bias voltages to the circuitry of IC U21, and the divider consisting of the switchable resistors R11-R12, R8-R13, and R9-R14 together with the capacitor C5 similarly biases IC U22 to determine signal output frequency as will be described below.

The timing circuits U21 and U22 are independently operable parts of a dual timing integrated circuit such as National Semiconductor LM556. The output signal from the timing circuit U21 is supplied via a resistor R2 to the input of the timing circuit U22. An RC circuit R3 and C7 supplies control voltage to the input of the IC U22 so that the control signal to the IC U22 is a function of the output signal from the IC U21.

The switching network pairs R9-R14, R8-R13, and R11-R12 in conjunction with a capacitor C5 operate to control the oscillation frequency of the circuit U22. A mode switch S1 is a slide switch or rotary switch for selecting the resistor pair: R9-R14 to produce the ultimate acoustic output frequencies of 26 KHz to 32 KHz for rodent control; R8-R13 to produce 33 KHz to 43 KHz for insect control; and R11-R12 to produce 44 Khz to 57 Khz for roach control.

The output of the circuit U22 is then delivered simultaneously through a coupling capacitor C3 to an electronic output signal jack J1 and to the non-inverting input of audio amplifier U1, which may be a National semiconductor LM384 or equivalent. The inverting input of the amplifier U1 is grounded, while the amplifier bypass pin is connected to ground via a bypass capacitor C1. The output of the audio amplifier U1, filtered by an oscillation suppression circuit R1 and C2, is coupled by a coupling capacitor C6 to a transducer TX1 in order to produce an acoustic output signal. Access to the electronic output signal from the master unit 12 is provided via the master unit Output jack J1, tapping into the signal generated by the timing circuit U22 for delivery as input to a satellite unit 16, to be described below in conjunction with FIG.3. The transducer TX1 can be an acoustic speaker of ordinary fidelity, operable in the 22 Khz to 58 Khz range.

Since these selectable operating acoustic output signals are above the normal range of human hearing, a test circuit comprising a capacitor C11 and a pushbutton switch S2 is provided to shunt the capacitor C5 to ground when the test switch S2 is pushed. Actuating the switch S2 produces an audible test signal in the 5.5 Khz to 6.5 Khz range, well within the hearing capability of a human operator.

Satellite Unit

The circuitry for a typical satellite unit 16 is illustrated in the schematic diagram of FIG. 3. An output electronic signal from, for example, output jack J1 in master unit 12 (FIG. 2) enters the satellite unit 16 as a satellite input signal $V_i$ via the input jack J101. The input signal $V_i$ is distributed through a resistive divider R108, R109 and an RF filter capacitor C103 to both a signal processor stage and a power driver stage of the satellite unit 12.

The signal processor stage utilizes a first comparator U101 that forms one section of a dual comparator integrated circuit, of which the other section is a second comparator U102 (utilized in the power driver stage to be described in detail below). Both comparators U101 and U102 have a reference voltage $V_R$ of approximately 3 volts DC applied to their non-inverting input terminals. $V_R$ is maintained by a voltage divider network R101, R102 and C101.

The filtered satellite input signal $V_i$ is applied to the inverting terminal of the first comparator U101 wherein the signal is inverted and is output through the voltage divider R110, R111 and a limiting resistor R112 to an electronic satellite output signal jack J102. This electronic output signal is thus a replicated signal $V_r$, being virtually identical to the original electronic output signal generated by the master unit 12 in shape and amplitude. The replicated electronic signal $V_r$ may then be used to "daisy chain" as an input signal to the next satellite unit (e.g., the second satellite unit 18) when multiple units are used.

The power driver stage uses the second comparator U102 with the signal $V_i$ and the reference voltage $V_R$ connected in the same manner as in the signal processor arrangement described above. However, the inverted output from the second comparator U102 is applied instead to a complementary push-pull audio amplifier in the power driver stage to produce an intermediate signal $V_{int}$ suitable for driving the capacitive load of a piezo transducer element speaker TX 101.

An NPN transistor Q101 and PNP transistor Q102 are base biased by the resistors R104 and R105, respectively, and the output from U102 is applied through a resistor R103 to Q102 so that on positive going cycles of the U102 output the Q101 transistor will source current, while on the negative going cycles the Q102 transistor will sink current. The intermediate signal $V_{int}$ on the commonly connected emitters is then conducted directly to the transducer TX 101 to emit an ultrasonic acoustic waveform 34 that is virtually identical to the sound waveform 32 being emitted from the master unit 12 (FIG. 2).

The intermediate signal $V_{int}$ is also coupled through a non-polar capacitor C102 to a Light Emitting Diode D101 and a resistor R106 in parallel with a resistor R107 to display the presence of signal input to the speaker.

Power for the satellite unit 16 is delivered from a plug-in transformer 26 (FIG. 2) in the form of 12 volts AC input to a power input jack J103. The use of a wall mounted transformer 26 advantageously minimizes heat, weight and hum conditions within satellite unit 16. A bridge rectifier DB101 and an input filter capacitor C105 form a conventional power supply arrangement producing 18 volts DC for use throughout the satellite unit 16.

In operation, the acoustic waveforms produced by the master unit 12 are emitted at a high volume and deter pests from inhabiting the affected area. The effect of this deterrence is significantly enhanced by including the satellite unit 16 integrated with and driven by the master unit 12 to extend the useful range of the master unit 16. Since the satellite unit 16 is powered by a transformer external to its main circuitry, the unit 16 itself is thus light in weight while matching or exceeding the master unit in power and quality of output. Additionally, since each satellite unit produces an electronic output signal $V_r$ that replicates the electronic output of the master unit 12, as many satellite units as are necessary may be serially connected to blanket an area to be protected from pests.

There is shown and described an exemplary embodiment of the present invention. The description herein is not intended to be limitative of the invention but is merely illustrative. The scope of the invention is limited only by the following claims.

I claim:

1. An apparatus for extending the effective operational acoustic range of an ultrasonic pest repelling device, said apparatus comprising:

an ultrasonic pest repeller master unit producing a master unit selectable electronic output signal and a corresponding master unit acoustic signal; and at least one satellite unit adapted to receive the master unit electronic output signal and to produce a replicated electronic signal and a satellite acoustic signal.

2. The pest repeller apparatus of claim 1 wherein the master unit selectable electronic output signal has an original shape and amplitude, said apparatus including a first apparatus comprising:

signal processor means for processing the master unit electronic output signal in order to produce said replicated signal having the original shape and amplitude of said master unit output signal;

power driver means for applying the master unit output signal received by said signal processor means to an included audio amplifier in order to produce an intermediate signal therefrom;

transducer means adapted to transform the intermediate signal from said power driver audio amplifier into an acoustic signal and to emit said satellite acoustic signal in the ambient.

3. The apparatus of claim 2 further comprising power supply means connected to supply power to both the signal processor means and the power driver means.

4. The apparatus of claim 3 wherein the power supply means comprises an external, wall mounted transformer producing AC power, and a rectifier network.

5. The apparatus of claim 3 wherein the power supply means comprises a primary or secondary storage battery producing DC power.

6. The apparatus of claim 2 wherein the transducer means comprises a piezo element speaker having an operating range of 22 KHz to 58 KHz.

7. The apparatus of claim 6 wherein the output driver audio amplifier comprises a complementary push-pull output stage.

8. The apparatus of claim 2 wherein the replicated signal is coupled to a second such satellite unit, said replicated signal from said first satellite unit providing an input signal to said second satellite unit.

9. The apparatus of claim 2 wherein a plurality of said satellite units are serially connected such that the replicated signal from any one such satellite unit provides the input electronic signal to the immediately subsequent unit.

10. A pest repeller apparatus adapted to deliver a selectable electronic output signal from an ultrasonic pest repeller master unit in the form of an electronic input signal to a first satellite unit in a serial chain of at least one such satellite units, said master unit having an acoustic waveform output signal corresponding to said electronic output signal, and each said satellite unit comprising:

signal processor means for processing the electronic input signal in order to produce a replicated signal for delivery to a subsequent satellite unit in said serial chain, said replicated signal having the original shape and amplitude of said master unit electronic output signal;

power driver means for applying the input signal received by said signal processor means to an included audio amplifier in order to produce an intermediate signal therefrom;

transducer means adapted to transform the intermediate signal from the power driver audio amplifier into a satellite acoustic signal and to emit the satellite acoustic signal in the ambient;and power supply means connected to supply power to both said signal processor means and said power driver means.

* * * * *